No. 764,176. PATENTED JULY 5, 1904.
W. H. BRISTOL.
THERMO ELECTRIC COUPLE.
APPLICATION FILED APR. 4, 1904.
NO MODEL.
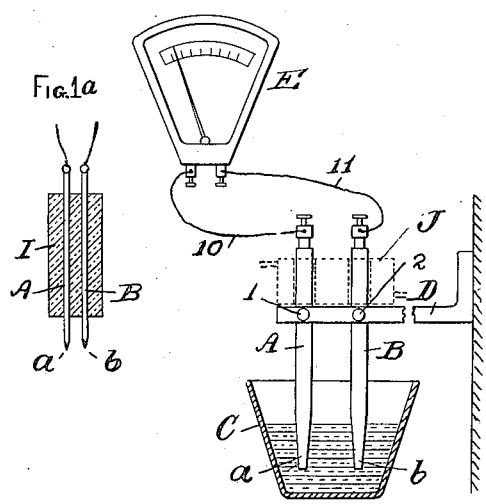
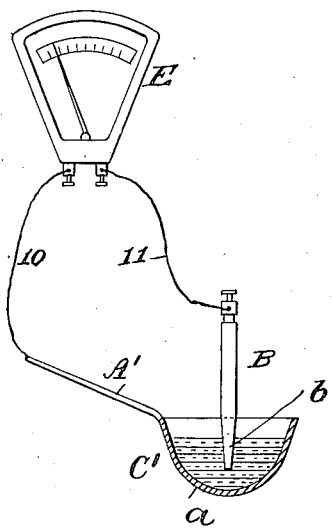
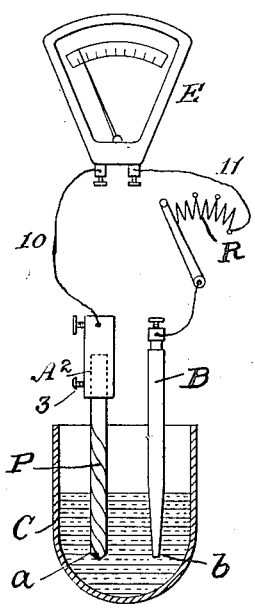
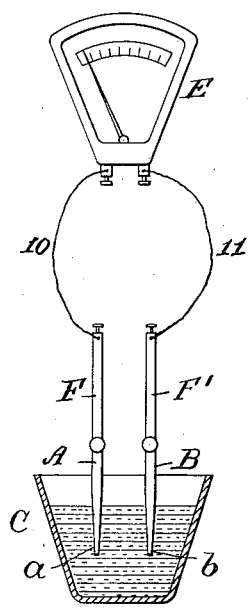
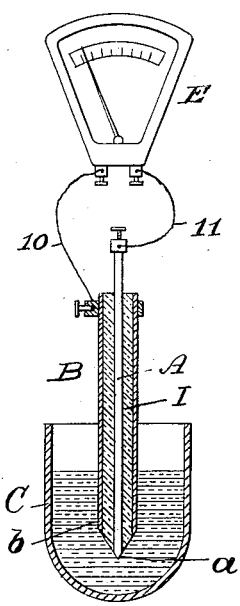
WITNESSES:
Wm T. Donnelly.
Simon Cooper.
INVENTOR:
William H. Bristol
BY
A. Faber du Faur Jr.
ATTORNEY.

No. 764,176. Patented July 5, 1904.

UNITED STATES PATENT OFFICE.

WILLIAM H. BRISTOL, OF HOBOKEN, NEW JERSEY.

THERMO-ELECTRIC COUPLE.

SPECIFICATION forming part of Letters Patent No. 764,176, dated July 5, 1904.

Application filed April 4, 1904. Serial No. 201,580. (No model.)

*To all whom it may concern:*

Be it known that I, WILLIAM H. BRISTOL, a citizen of the United States of America, residing at Hoboken, in the county of Hudson and State of New Jersey, have invented certain new and useful Improvements in Thermo-Electric Couples, of which the following is a specification.

My invention has reference to improvements in thermo-electric couples, and particularly to those adapted for use in pyrometers for indicating or measuring the temperatures of baths—such, for instance, as molten lead, copper, tin, aluminium, &c.—used in the arts for various purposes, as well as for measuring the temperatures of mercury or like metallic baths of lower or low temperatures. Heretofore pyrometers for this purpose have been composed of two elements—such, for instance, as platinum and a platinum alloy, steel and nickel, &c.—of which the ends intended for immersion in the bath were attached to each other generally by electric welding to form a junction. The ends of the elements soon become brittle, corroded, or amalgamated with repeated or continued use, and consequently the readings of the instrument are unreliable. It is difficult to replace the junction or to repair the same, and new elements must generally be substituted.

According to my invention I do not directly connect the terminals or ends of the elements comprising the couple, but leave the same in a separated condition and cause their junction to be virtually effected by a liquid metallic bath into which the terminals are introduced, or I accomplish the same result by making use of the receptacle as one element of the couple or form the entire or a part of one element by the article which is to be subjected to the temperature desired in the bath. It will readily be understood that if the terminals become corroded, amalgamated, &c., they can be easily ground down or replaced by new ones with very little expense.

My invention therefore consists, essentially, in a thermo-electric couple comprising two separated elements, a liquid bath into which said elements extend, and means in connection with said elements for measuring the difference of temperatures at opposite ends thereof by means of the variation of electromotive force due to the difference of temperature at opposite ends of the dissimilar metals forming the couple.

The nature of my invention will best be understood when described in connection with the accompanying drawings, in which—

Figure 1 represents an elevation, partly in section, showing diagrammatically one form of pyrometer embodying my invention. Fig. 1ª shows the elements held to each other by an insulating material. Fig. 2 is a similar view showing a modified form in which the receptacle forms one of the elements of the couple. Fig. 3 is a similar view showing the article to be treated connected directly with and forming part of one of the elements. Fig. 4 is a similar view showing a modified manner of arranging the elements. Fig. 5 is a similar view showing a modified form for the elements.

Similar letters and numerals of reference designate corresponding parts throughout the several views of the drawings.

Referring to Fig. 1 of the drawings, the letters A and B designate the elements of a thermo-electric couple, the terminals $a$ and $b$ of which are left separated one from the other instead of being joined together, as usual. C is a receptacle which may be in the form of a pot or crucible or may be the hearth of a furnace into which the elements A and B are placed and, if desired, maintained in a definite or adjustable position by means of a suitable bracket D, provided with sockets in which the elements are held by means of fastening-screws 1 or other suitable means. E is an electrical indicating or recording instrument—such, for instance, as a voltmeter of any suitable construction—to the binding-posts of which the elements are connected by wires 10 and 11. It will readily be understood that when the ends of the elements A and B are immersed in the bath contained in the receptacle C the liquid or molten metal in itself acts as a junction or bridge for the two terminals and a current is established in the same manner as if the elements were directly joined, the electromotive force depending on the difference in temperature between the two opposite ends or terminals of the elements. The elements may be simply separated, as shown in Fig. 1, or they may be held to each other by an insulating material I, which should be of a refractory nature when the instrument is to be used for measuring high temperatures, Fig. 1ᵃ. It is evident that the receptacle, if made of metal or other material which will form one of the elements of a couple, can be used as one element of the thermo-electric couple provided a portion, as A', of the same is extended sufficiently to form a cold end, or the same result could be obtained by attaching a bar of the same material as the receptacle to the receptacle. This construction is shown in Fig. 2. Again, the article to be heated may be attached to one of the elements and practically form part of the same in coöperation with the other element. A construction of this character I have illustrated in Fig. 3, where P designates the article to be immersed in the bath—say, for instance, a steel drill—and A² is one of the elements which is provided with means for attaching the article—such, for instance, as a socket and screw 3. Of course a pair of tongs adapted to hold the article and placed in electrical connection with the indicating or measuring instrument can be used to the same end. As the character or nature of the steel or other metal varies with different lots, I find it practicable to employ means for changing the resistance in the circuit according to the varying conditions. The variable resistance R interpolated in the circuit enables an instrument having a single scale or chart to be used with different metals forming the elements. By properly adjusting the resistance when the elements are placed into a bath, which is just at its melting or fusing point, until the indicating-hand gives a reading corresponding to the known melting-point of the bath, the instrument will be correct at this temperature. In case of elements such, for instance, as nickel and steel slight variations in different lots would not seriously affect the remaining readings of the instrument. The variable resistance also permits an instrument with a scale to be readily adjusted by varying the resistance so that the indications will correspond to graduations over the whole range. The same arrangement (shown in Fig. 3) is applied in the commercial tinning or galvanizing of metallic plates.

In Fig. 4 I have shown the couple in convenient form for commercial use, one of the elements, A, being in the form of a rod and the other, B, in the form of a tube, the intervening annular space being filled with insulating material I, which should be of a refractory nature when the instrument is to be used for measuring high temperatures. When with continued or repeated use the end exposed to high temperatures becomes brittle or is burned out sufficiently to cause an appreciable error in the reading of the instrument, the parts so affected can be readily removed by grinding or otherwise, so as to present new surfaces to the bath for reëstablishing the connection through the medium of the liquid bath.

For pyrometers for measuring extremely high temperatures the construction shown in Fig. 5 is very suitable. In this instance I make use of primary elements, as A and B, which are not joined excepting when bridged by the liquid bath and are made of materials, such as platinum and platinum-alloy, capable of withstanding high temperatures, and combined with the same are conductors, as F and F', of a cheaper material—say steel—not capable of resisting extremely high temperatures and are not exposed to the extremely high temperatures. These additional conductors form secondary couples, neutralizing each other, as described in my prior application, Serial No. 196,440, filed March 5, 1904, and need not be more fully described here.

Of course it is to be understood that the receptacle C of Fig. 3 could, similar to the receptacle C' of Fig. 2, be used as one of the elements instead of employing the element B.

Since the electromotive force of the couple depends on the difference of temperature at opposite ends of the elements, it is evident that in order to eliminate the effects of changes in the surrounding atmosphere at said outer ends suitable means for maintaining a constant temperature should be used. A water, steam, or other jacket, as J, of a usual construction (indicated by dotted lines in Fig. 1) will answer this purpose and is applicable to all the other forms here shown.

What I claim as new is—

1. A thermo-electric couple comprising two separated elements, a liquid bath into which said elements extend, and means in connection with said elements for measuring the difference of temperature at opposite ends thereof by means of the variation of electromotive force due to the difference of temperature at opposite ends of the dissimilar metals forming the couple.

2. A thermo-electric couple comprising two separated elements having separated hot terminals or ends, a liquid bath into which said elements extend, and means in connection with said elements for measuring the difference of temperature at opposite ends thereof by means of the variation of electromotive force due to the difference of temperature at opposite ends of the dissimilar metals forming the couple.

3. The combination with a thermo-electric couple comprising two separated elements, an electrical measuring instrument in connection with the hot or cold ends of the elements, and a liquid bath connecting the opposite ends and forming an electrical connection between elements.

4. A thermo-electric couple comprising two separated elements, a liquid bath into which said elements extend, means in connection with said elements for measuring the difference of temperature at opposite ends thereof by means of the variation of electromotive force due to the difference of temperature at opposite ends of the dissimilar metals forming the couple, and a variable resistance interposed in the circuit.

5. A thermo-electric couple comprising two separated elements, a liquid bath into which said elements extend, an insulation between the elements, and means in connection with said elements for measuring the difference of temperature at opposite ends thereof by means of the variation of electromotive force due to the difference of temperature at opposite ends of the dissimilar metals forming the couple.

6. A thermo-electric couple comprising a tubular element, a second element made in the form of a rod and passing into the first element, and an intermediate filling of insulating material, said elements being separated from each other, substantially as described.

7. A thermo-electric couple comprising two separated elements, a liquid bath into which said elements extend, means in connection with said elements for measuring the difference of temperature at opposite ends thereof by means of the variation of electromotive force due to the difference of temperature at opposite ends of the dissimilar metals, and means for maintaining the temperature at the outer ends of the elements substantially constant.

In testimony whereof I have hereunto set my hand in the presence of two subscribing witnesses.

WILLIAM H. BRISTOL.

Witnesses:
RAENA H. YUDIZKY,
A. FABER DU FAUR, Jr.